July 26, 1966 R. G. BEAVERS 3,262,268
THRUST REVERSER
Filed June 7, 1965 3 Sheets-Sheet 1
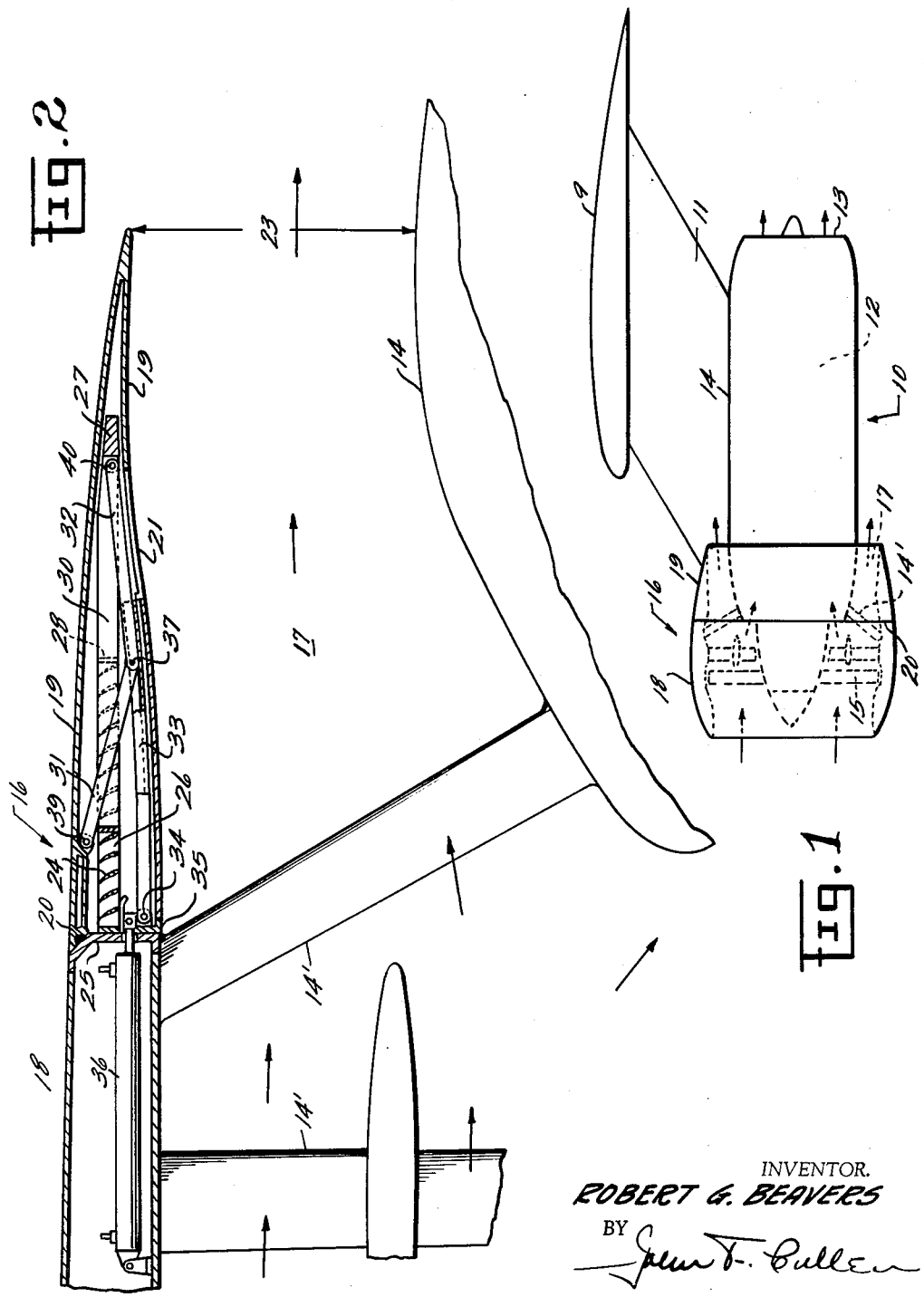
INVENTOR.
ROBERT G. BEAVERS
BY
ATTORNEY

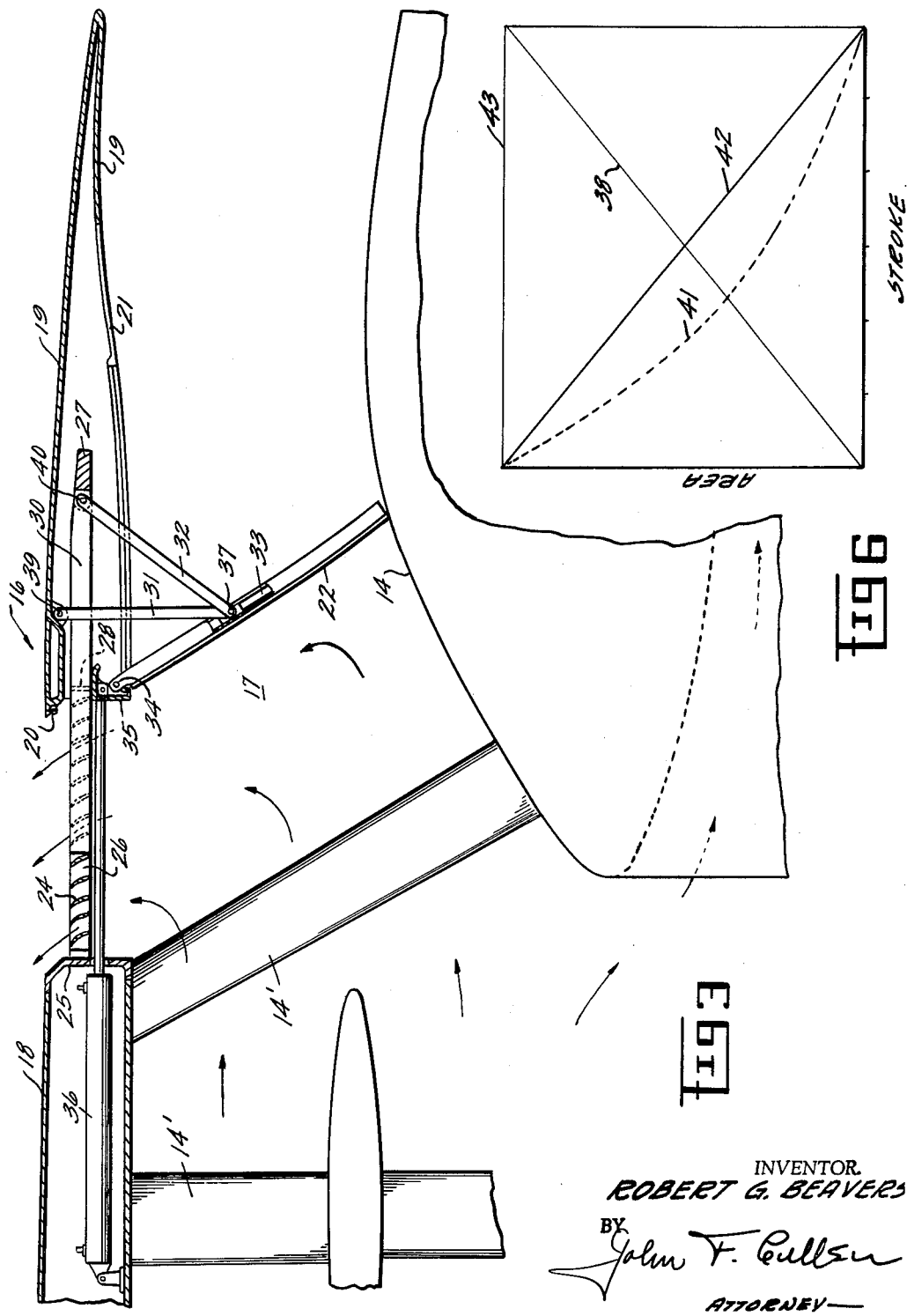

July 26, 1966  R. G. BEAVERS  3,262,268
THRUST REVERSER
Filed June 7, 1965  3 Sheets-Sheet 3

INVENTOR.
ROBERT G. BEAVERS
BY
John F. Cullen
ATTORNEY

United States Patent Office 3,262,268
Patented July 26, 1966

3,262,268
THRUST REVERSER
Robert G. Beavers, Mason, Ohio, assignor to General
Electric Company, a corporation of New York
Filed June 7, 1965, Ser. No. 462,790
10 Claims. (Cl. 60—35.54)

The present invention, a continuation-in-part of application Serial No. 410,616 filed November 12, 1964, now abandoned, relates to a thrust reverser mechanism and, more particularly, to a thrust reverser mechanism that is particularly applicable to bypass type fan engines.

With the advent of the fan engine, whether forward or aft fan, it has become necessary to supply a thrust reverser mechanism to reverse the fluid flow through the generally annular cross-section of the bypass duct. Because the use of fans with conventional jet engines results in larger diameter engines or cruise fans, it is desired to provide a reverser mechanism that does not add to an already large diameter. Furthermore, because the engines become large and the reversing operation must be carried out on a relatively large periphery, it becomes important that the reversing structure be lightweight and straightforward and simple in operation. The high bypass ratio turbofan of up to 8 to 1 and above, is a fan engine in which a very large quantity of the propulsive fluid is sent through the annular bypass duct. In such engines, it may be possible to reverse only the bypass flow since the flow through the jet engine whether concentric or remote is a proportion as small as 10%–15% of the total flow. Reversing efficiently only the bypass flow in such high bypass ratio engines is sufficient to obtain the reversing necessary to meet specifications.

It is well understood that thrust reversers must perform two functions. They must stop the flow and they must turn the flow into the reverse direction. It is desired to do this where there is as little disturbance or change as possible in the normal aerodynamic members that are required for other engine functions.

In most of the present type thrust reversers, the aircraft geometry has been compromised to reflect the physical mass of the reverser unit. As stated above, it is desired to provide a reverser that will fit the aircraft structure as it exists for other aerodynamic functions. It is also important that a thrust reverser be capable of supplying good thrust modulation characteristics to provide for immediate and full thrust in the case of a wave-off or go-around condition during a landing operation. Also the reverser must not interfere with the operation of the engine by causing overspeed or stalling when actuated. In other words, it is desirable that the engine be kept operating at its full rotating speed and that the thrust reverser be able to move quickly from the forward to reverse position and back again without changing the loading of the fan or gas generator. Furthermore, the thrust reverser should be fail-safe so that it will stay in the reverse thrust position in the event of structural failure while the reverser is being used as a landing roll reverser.

The main object of the present invention is to provide a thrust reverser that is applicable to high bypass ratio turbofan engines and which splits the functions of the thrust reverser both functionally and structurally.

A further object is to provide such a reverser which employs susbtantially the existing fan structure without compromising any of the aerodynamic characteristics desired for other functions.

A further object is to provide such a reverser in which it is unnecessary to provide the usual sealing structure in intermediate positions and which uses predetermined gaps determined by controllably actuated blocker structure that completely seals in a fully reversed position.

Another object is to provide such a reverser wherein the non-sealing feature is taken advantage of by programming the exhaust area such that the fan sees a constant exhaust area under all conditions of operation.

A further object is to provide a reverser wherein the blocking flaps are disposed upstream of the throat so that any pressure losses are in the low velocity section and minimized.

Another object is to provide such a reverser in which a single actuating system employing simple lightweight scissors type linkage obtains all the functions and advantages mentioned above.

Briefly stated, the invention is directed to use in a jet propulsion powerplant of the front fan high bypass ratio type having an inner wall and a fan concentric therewith and extending radially beyond the wall. This may be an aft or a forward fan engine when the wall encloses an engine. A thrust reverser mechanism is provided in a cowling surrounding the fan and spaced from the wall to form a bypass duct. The cowling is conveniently split into forward and aft abutting cylindrical portions which form inner and outer flow surfaces when closed in cruise position. The forward portion is provided with peripherally spaced track support means fixed thereto and extending downstream. A ring joins the downstream ends of the support means and a box like structure is thus provided. A plurality of flow reversing cascades are peripherally disposed in the box and fixed to the support means. The aft cowling portion is supported and carried on the track means and telescopes over the cascades when it abuts the forward portion. There is provided a plurality of peripherally disposed blocker flaps that are pivoted at their upstream ends to the aft cowling portion and are designed to nest in the inner surface of the aft cowling to form part of the inner flow surface in cruise position. Actuating means are disposed in the cowling with an actuator in the forward portion of the cowling and linkage structure in the aft portion of the cowling. The actuator controllably interconnects the parts to translate and rotate the flaps into an extended blocking position in the duct and simultaneously translate the aft cowl portion downstream to uncover the cascades. No seals are used between any flaps and they are programmed to maintain substantially constant flow area from the duct at all times from full forward to full thrust reversal. The cowling trailing edge and the inner wall may form a convergent nozzle in the cruise position.

While the specification concludes with claims particularly pointing out and distinctly claiming the subject matter which is regarded as the invention it is believed the invention will be better understood from the following description taken in connection with the accompanying drawings in which:

FIG. 1 is a plan view of a typical front fan powerplant supported from an aircraft wing and employing the instant invention;

FIG. 2 is an enlarged cross-sectional view in the area of the reverser showing the reversing mechanism in cruise position;

FIG. 3 is a view similar to FIG. 2 showing the mechanism moved into reverse thrust position;

FIG. 6 is a graphical representation of the area versus stroke achieved by the linkage mechanism.

Figure 4:
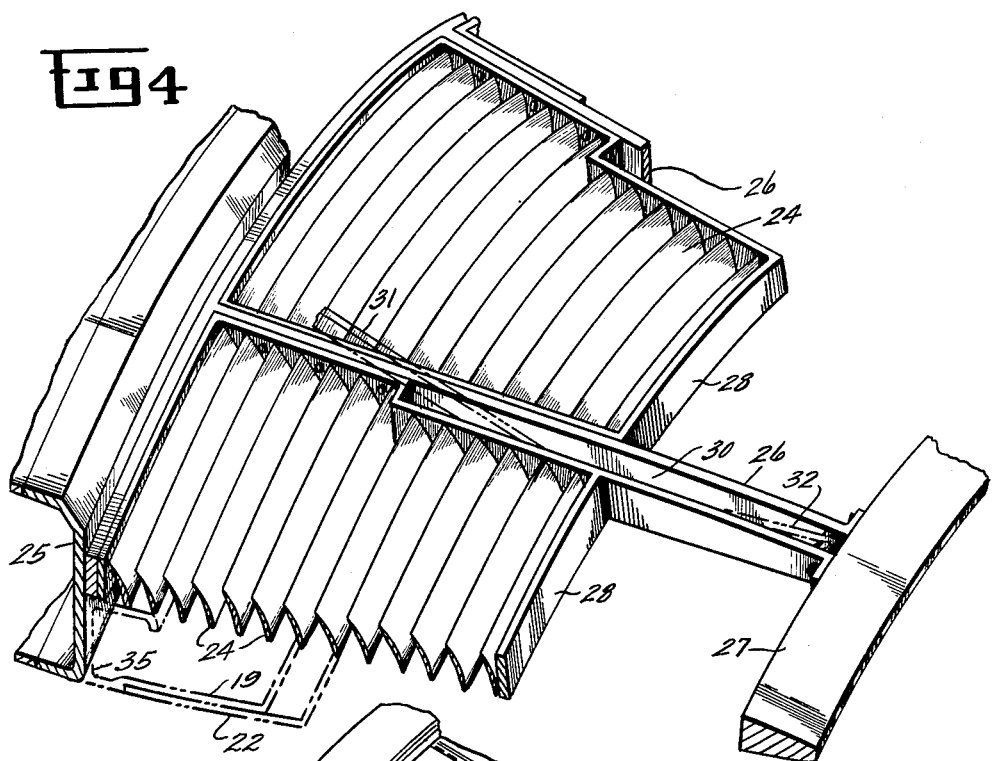
FIG. 4 is a partial perspective view of the cascade and track supporting structure.

It should be understood that the front fan high bypass ratio powerplant is described for illustration and the invention is equally applicable to aft fan powerplants as well as cruise fans. Also, the invention is described in connection with a front fan powerplant with a concentric jet engine wherein the fan cowling does not extend completely back to the rear of the jet engine wall although the invention is equally applicable to such an installation. High bypass ratio fans are those in which the ratio of the fluid passing through the fan to the jet engine may be as high as 8 to 1 or above. In such installations it may be necessary to reverse only the fan flow for satisfactory performance and the jet engine exhaust may be ignored.

Referring first to FIG. 1, there is shown a front fan powerplant of the general type that might employ the instant invention. To this end, an aircraft structure such as wing 9 may support an engine generally indicated at 10 by means of a conventional strut or pylon structure 11. Engine 10 may be of the front fan concentric type as shown in FIG. 1 which employs an inner jet engine 12 discharging through a nozzle 13 to provide thrust. The jet engine is enclosed within a wall 14 in the conventional manner. While described in connection with a concentric fan jet engine it should be noted that wall 14 may be the wall of a plug in a pure cruise fan fed from a remote gas generator in a well known manner. For convenience of description, the concentric arrangement will be described. In order to provide additional thrust in the well known manner, a fan 15 concentric with the engine and extending radially beyond the wall 14 is provided. The fan 15 is surrounded by cowling 16 which is larger in diameter than the engine and spaced from the engine wall 14 to form a bypass duct 17 for the additional thrust by movement of relatively large masses of lower velocity air in the well known manner. As explained above, in the high bypass ratio type powerplant this mass of air may be as high as eight or greater times the amount of airflow through the engine 12. The fan air is thus used to propel fluid through the duct 17 as well as to supercharge the engine 12.

In order to provide a simplified and lightweight reverser for the fan structure and bypass flow it is advantageous to make direct use of the cowling 16 as part of the reverser mechanism. At the same time, it is desired that cowling 16 be kept as thin as possible for desired aerodynamic reasons. For this reason, and to avoid compromising the physical characteristics of the engine geometry, the present invention splits the reverser functionally and structurally.

The two functions that a reverser must perform are (1) stopping the flow and (2) turning the flow. The present invention provides structure to perform both of these functions and splits the structure so that two separate but interconnected systems all disposed within the cowling perform the two functions and still maintain the aerodynamic features of the engine substantially undisturbed. Additionally any minor disturbance is conveniently maintained upstream of the nozzle throat in the subsonic flow region where the pressure losses are minimized. Referring next to FIG. 2, it will be seen that cowling 16 is split peripherally around itself into a forward portion 18 and an aft portion 19. These portions may be generally seen in FIG. 1. In the cruise position, the forward and aft portions 18 and 19 are substantially cylindrical and abut and seal generally along line 20. It will be seen that both portions form the inner and outer flow surfaces in the cruise position of FIG. 2.

In order to reverse the flow through duct 17 it is necessary first to block the flow. To this end, there is provided a plurality of peripherally disposed blocker flaps 22 that are pivoted at their upstream ends to the aft cowling portion 19 and nest therein to form part of the inner flow surface in the cruise position as shown. It is to be noted that the upstream pivoting of blocker flaps 22 provides that the flaps may immediately be retracted in the event of a wave-off in a landing operation resulting in immediate full thrust from the powerplant. Further, it will be noted that the engine wall 14 and the trailing edge of the aft cowling portion 19 may form a converging nozzle with throat 23 therebetween. In order to store flaps 22 they are designed to be retractably nested to form a smooth inner wall surface in the cruise position as shown in FIG. 2. It will be apparent then that the flaps 22 are disposed in a subsonic velocity or lower pressure region so that any losses due to interruptions in the smooth flow surface when the flaps are nested are minimized by location of the flaps upstream of the nozzle 23. The individual nesting arrangement may be clearly seen in FIG. 5. It will be apparent also that these flaps 22 may be quite thin and thus easily actuated to form the smooth flow surface necessary in the FIG. 2 cruise position. Movement of flaps 22 into duct 17 by an arrangement to be described then blocks the flow.

The second function of reversing the flow is obtained by means of a fixed ring of flow reversing cascades 24 that are fixed to and extend aft from forward cowl portion 18 as shown. It can be seen that these cascades, since they are fixed and do not move may be relatively thin and simple in construction and easily fit into the thin cowling structure 16. The reversing function is then performed by these cascades 24 which, in an installation as shown in FIG. 1, may preferably extend completely around the periphery although not limited to a complete peripheral arrangement.

In order to support the cascades and the rest of the structure downstream of the forward portion, the forward portion may be supplied with a flange 25 as one of the main load and stiffening members. During reverse thrust operation, the inner wall structure 14 receives the loads imposed on cowling 16 through struts 14' which support the cowling from center wall 14 upstream of the flaps 22. Flange 25 provides a fixed base from which a series of peripherally spaced track support means such as beams 26 are provided. In order to stiffen the whole structure and provide a fixed member for pivoting the linkage mechanism to be described, the downstream ends of the track support means 26 are joined by a ring member 27. The combination of beams 26 and ring member 27 with suitable cross beams 28 as shown in FIG. 4 provide a rigid lattice work in which individual cascades 24 may be placed as shown. The cascades 24 are secured in any suitable manner such as bolts. Any damaged cascades or a desire for a different orientation may be obtained by replacing the individual cascades 24 as will be apparent. The individual beams 26 have a suitable slot portion 30 that is sealed in a suitable manner in the reverse thrust position and through which the flap actuating linkage may be moved as will be apparent hereafter.

When reversal is not desired it is necessary that aft cowl portion 19 be designed to telescope over cascades 24 so that the cascades are covered or completely surrounded by the aft cowl 19 in the cruise position as shown in FIG. 2. To this end, aft cowl 19 is formed of thin sheet metal flow surfaces and conveniently slides on track support means 26 from the cruise position shown in FIG. 2 to the reverse thrust position shown in FIG. 3.

For actuation, it is desired to have a simple lightweight linkage that fits in the cowling and programs the blocker flap movement so that the upstream fan always sees a constant area for best engine efficiency. This is obtained by a simple scissors type linkage arrangement comprising a first lever 31 that may be pivoted at 39 at its upstream end to and within the aft cowling portion through the slot 30 between the cascades. The pivot connection 39 may be by any suitable means such as a well known hat-section to the movable surface of aft cowling 19. A second lever 32 is pivoted at its downstream end at 40 a fixed ring member 27 to form the other end of the simple scissors linkage.

Figure 5:
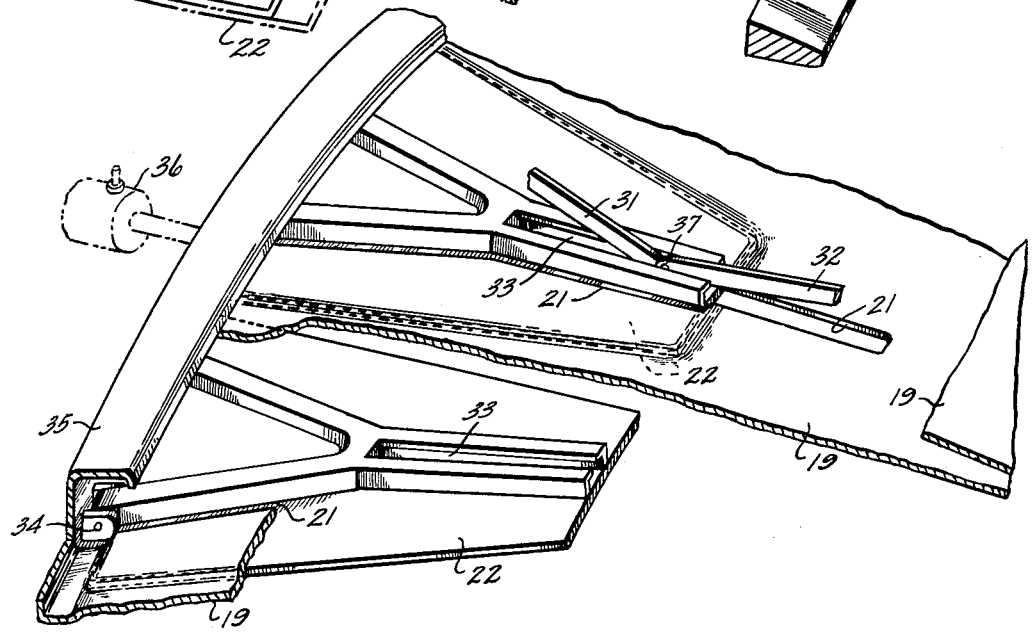
FIGURE 5 is a partial perspective view of the blocker flaps.

In order to develop the forces necessary to move the flaps, a single member may usefully serve a triple purpose. Reference to FIG. 5 shows that each flap 22 is provided with a slotted stiffener 33 on the back thereof which may lie within the slot 21 as shown in retracted position of the flaps. The slotted stiffener 33 serves the purpose of stiffening the individual flaps 22, it provides the pivot means at 34 from a translatable ring 35 which will be later explained. Furthermore, slotted stiffener 33 provides a convenient means wherein levers 31 and 32 may be connected together at 37 in the slot of the stiffener by a suitable bolt and pin arrangement not shown to develop an inward force on the flaps 22.

In order to actuate the structure to the reverse thrust position shown in FIG. 3, a simple actuator 36 may be provided in the forward cowling portion. This is connected to and translates ring 35 which ring is the connecting member between the actuator and the aft cowling portion through the pivots 34. Thus, movement of ring 35 aft results in translation of flaps 22 and then rotation of the flaps into the duct 17 to block the flow. Simultaneously through the connection shown, the aft cowling portion 19 moves downstream to the position shown in FIG. 3. Thus it will be seen that the actuating means, consisting of actuator 36 and scissors linkage 31 and 32, controllably interconnects the flaps and the aft cowling portion to translate and rotate the flaps into the extended blocking position of FIG. 3 and simultaneously translate the aft cowling portion downstream to uncover the cascades to direct the blocked duct flow in the reverse direction.

It will be noted that the use of the simple scissors linkage shown results in a varying travel of the pivot point 37 on the blocker flaps. Referring next to FIG. 6, there is shown a plot of the exhaust area versus the actuator stroke. It will be apparent that the flow area through the cascades is opened with constant increments of stroke of the actuator. This flow area will open as a linear relationship as shown by line 38. With the simple scissors linkage employed herein, it will also be apparent that a variable relationship is involved. In other words, at the beginning of the stroke of actuator 36, a small movement of the actuator, i.e., a small movement of pivot point 39 of link 31 will, because of fixed pivot 40, result in a large movement of the common pivot 37 between the two links and thus movement of the flap. This is shown by line 41 where it will be apparent that the rate of change of the flap starts out high and ends up low. Consequently, the cascades are being uncovered at a constant rate whereas the flaps are closing the area at a variable rate. What is desired is a change in the blocked area which is also a straight line relationship such as shown by line 42. If line 42 can be obtained, then the sum of lines 38 and 42 will be line 43 which represents a constant area change. This desirable arrangement may be conveniently obtained in the instant invention by providing the blocker flaps in the form of isosceles trapezoids as shown in FIG. 5. Such a shape for a flap itself is not new. However, the instant flaps are deliberately designed with no sealing between their edges. This absence of edge seals obviates many tolerance problems and provides variable triangular leakage areas between the flaps. Normally, this leakage is undesirable but, in the present invention it is possible to take advantage of this situation. By sizing parts and controllably interconnecting the linkages it is possible to move line 41 substantially up to line 42. The means the nonlinear movement of the scissors linkage may effectively be made into a linear movement by adding increments of area when needed so the sum of lines 41 (or 42 with the added areas) and 38 is a constant area flow path as represented by line 43. The flap edges are merely made to abut and seal against one another in the fully extended blocking position when they touch the wall 14.

Thus, the advantages of a simple scissors linkage structure are obtained. Such structure may be stowed in the relatively thin aft cowl portion and the difficult problem of constantly sealing between the flaps may be obviated by deliberately omitting the seals. These complementing advantages result in the engine seeing a constant area discharge for efficient operation. However, applicant attains these results with the lightweight easily stowed simple structure shown and avoids the necessity of seals between the individual flaps by taking advantage of the space therebetween to offset the non-linear relationship represented by line 41 in FIG. 6.

It will be apparent that the thrust reverser herein disclosed provides for maintaining the thin cowling 16 and still permits the reversing function to be performed within the cowling and the blocking function to be performed by structure that may be easily stowed within thin cowling. Additionally, the individual cascades 24 are fixed and are easily replaceable. They are simple, lightweight and of thin construction and perform only a reversing function. The blocking function is performed by the blockers 22 separated from the reversing function and conveniently and aerodynamically placed in the cowling in the low pressure region where the pressure losses are minimized. Suitable actuating means controllably interconnects the structure while maintaining the constant flow area without the use of seals between the individual flaps.

While there have been described preferred forms of the invention, obvious modifications and variations are possible in light of the above teachings. It is therefore to be understood that within the scope of the appended claims, the invention may be practiced otherwise than as specifically described.

I claim:
1. In a jet propulsion powerplant of the fan type having an inner wall and a fan concentric therewith and extending radially beyond said wall, thrust reverser mechanism comprising,
   a cowling surrounding said fan and spaced from said wall to form a bypass duct,
   said cowling being split into forward and aft abutting portions forming inner and outer flow surfaces in cruise position,
   a fixed ring of flow reversing cascades disposed within said aft portion,
   a plurality of peripherally disposed blocker flaps pivoted at their upstream ends to said aft portion and forming part of the inner flow surface thereof in cruise position, and
   actuating means disposed within said cowling and controllably interconnecting said flaps and aft cowling portion for translating and rotating said flaps into extended blocking position in said duct and simultaneously translating said aft portion downstream for uncovering cascades and maintaining substantially constant flow area from said duct and reverse the duct flow.

2. Apparatus as described in claim 1 wherein said cascades are fixed to said forward portion and track supporting means are connected to said forward portion and extend into said aft portion to support and translate said aft portion over said cascades into abutting position with said forward portion.

3. Apparatus as described in claim 1 wherein strut means is provided connected to said wall upstream of said flaps for support of said cowling and transmission of thrust reverse loads through said cowling to said wall.

4. Apparatus as described in claim 1 wherein said aft cowling portion and wall form a nozzle in the abutting position.

5. Apparatus as described in claim 1 wherein said blocker flaps are formed as isosceles trapezoids with predetermined gaps therebetween during movement across said duct to abut each other along the edges in fully extended position touching said wall.

6. In a jet propulsion powerplant of the front fan high bypass ratio type having an inner wall and a fan concentric therewith and extending radially beyond said wall, thrust reverser mechanism comprising,
   a cowling surrounding said fan and spaced from said wall to form a bypass duct,
   said cowling being split into forward and aft abutting cylindrical portions forming inner and outer flow surfaces in cruise position, peripherally spaced track support means fixed to said forward portion and extending aft, a ring member joining the downstream ends of said support means, a plurality of flow reversing cascades peripherally disposed between and fixed to said support means, said aft cowling portion supported and carried on said track means and telescoping over said cascades when abutting said forward portion, a plurality of peripherally disposed blocker flaps pivoted at their upstream ends to said aft portion and nesting therein to form part of the inner flow surface in cruise position, actuating means disposed within said cowling and controllably interconnecting said flaps and aft cowling portion for translating and rotating said flaps into extended blocking position in said duct and simultaneously translating said aft portion downstream for uncovering said cascades and maintaining substantially constant flow area from said duct and reverse the duct flow.

7. Apparatus as described in claim 6 wherein said aft cowling portion trailing edge and said wall form a convergent nozzle in said abutting position.

8. Apparatus as described in claim 6 wherein each of said flaps has a slotted stiffener on the back thereof, and said actuating means for said flap includes a first lever pivoted to and within said aft cowling portion at the upstream end thereof and between said cascades, a second lever pivoted to said ring member, and each of said levers being connected together in said slotted stiffener to form a scissors linkage to translate and rotate said flaps.

9. Apparatus as described in claim 8 wherein said blocker flaps are formed as isosceles trapezoids with predetermined gaps therebetween during movement across said duct to abut each other along the edges in fully extended position touching said wall.

10. Apparatus as described in claim 8 wherein said actuating means includes an actuator in said forward cowling portion, a connection between said actuator and said aft cowling portion through said blocker pivots, and said linkage is disposed within said aft cowling portion in cruise position.

References Cited by the Examiner
UNITED STATES PATENTS

| | | | |
|---|---|---|---|
| 2,847,823 | 8/1958 | Brewer. | |
| 2,938,335 | 5/1960 | Cook | 60—35.54 |
| 2,950,595 | 8/1960 | Laucher et al. | 60—35.54 |
| 3,034,296 | 5/1962 | Keen et al. | 60—35.54 |
| 3,036,431 | 5/1962 | Vdolek | 60—35.54 |
| 3,068,646 | 12/1962 | Fletcher | 60—35.54 X |
| 3,113,428 | 12/1963 | Colley et al. | 60—35.6 X |

FOREIGN PATENTS 955,518   4/1964   Great Britain.

MARK NEWMAN, *Primary Examiner.*

C. R. CROYLE, *Assistant Examiner.*